(12) United States Patent
Hewitt

(10) Patent No.: US 7,493,825 B2
(45) Date of Patent: Feb. 24, 2009

(54) LOAD INDICATING TAKE-UP FRAME

(75) Inventor: William Gregory Hewitt, Taylors, SC (US)

(73) Assignee: Reliance Electric Technologies, LLC, Greenville, SC (US)

( * ) Notice: Subject to any disclaimer, the term of this patent is extended or adjusted under 35 U.S.C. 154(b) by 330 days.

(21) Appl. No.: 11/510,536

(22) Filed: Aug. 21, 2006

(65) Prior Publication Data

US 2008/0044117 A1   Feb. 21, 2008

(51) Int. Cl.
*G01B 5/30* (2006.01)

(52) U.S. Cl. .......................................... 73/760; 73/161

(58) Field of Classification Search ................... 73/760, 73/161
See application file for complete search history.

(56) References Cited

U.S. PATENT DOCUMENTS

| 4,346,708 | A | * | 8/1982 | LeVeen et al. | ............... | 604/224 |
| 5,030,173 | A | * | 7/1991 | Bryant | ........................ | 474/136 |
| 6,200,036 | B1 | | 3/2001 | Girardey | | |

* cited by examiner

*Primary Examiner*—Max Noori
(74) *Attorney, Agent, or Firm*—Thompson Coburn LLP

(57) ABSTRACT

A method of operating a take-up frame is disclosed herein. Specifically, a method of operating a take-up frame is disclosed which includes reading a force indication, wherein the force indication is obtained and provided through mechanical means. Additionally, the method includes adjusting the amount of force applied to achieve a desired amount of force.

14 Claims, 3 Drawing Sheets

LOAD INDICATING TAKE-UP FRAME

BACKGROUND

The invention relates generally to take-up frames and similar structures for rotating machinery bearings. In particular, the invention relates to a load indicating system for take-up frames.

In rotating equipment, such as conveyor belts, chain drives or other systems, bearing assemblies are provided for securing a rotating element, such as a shaft, with respect to support or stationary components. Typically, one end of the system is fixed in position, while the opposite end is moveable. For example, the fixed end may be supported on a pillow block, while structures such as take-up frames are provided on the moveable end to allow for tension adjustment.

Take-up frames have a framework for supporting a moveable bearing set. Specifically, the framework may include glides, or guiding rails which support the bearing set while allowing it to move within the framework. A tension or compression adjustment member, such as a threaded rod may be supported by a threaded nut. Special bearing sets may be employed, including housings adapted to receive the tension or compression adjustment member. The position of the bearing assembly is adjusted by turning the thread rod or the nut to slide the bearing set into the desired location, hereby adjusting the tension on a belt, chain, or other component supported by the take-up frame bearing.

Such take-up frames and bearing sets are employed to maintain tensile or compressive forces within machine systems. Upon installation, the take-up frames are situated generally parallel to the forces to be regulated, such that adjustment of the bearing set position will tend to tighten or relax a machine component fitted around an associated rotated member. For example, in belt conveyors and the like, take-up frames are often positioned on either side of a pulley. In chain drives, take-up frames may be positioned on one or both sides of an endless chain. Changes in the initial installed tensile or compressive forces may cause premature wear and require frequent component repair or replacement. Moreover, it is often difficult to judge the force or tension set via adjustment of the take-up frame both during initial installation and subsequently, as the system relaxes or wears.

There is a need, therefore, for arrangements that will permit measurement or feedback of forces exerted by a take-up frame. There is a particular need for relatively simple, mechanical systems that can provide such feedback in a reliable manner.

BRIEF DESCRIPTION

The present invention provides a technique for regulating forces applied to a take-up frame. The technique may be used in systems in which the take-up frame is positioned either in tension or compression, providing feedback on forces exerted on the bearing sets in either case.

In accordance with one aspect of the present invention a bearing take-up frame assembly is provided comprising a bearing housing configured to move within a take-up frame framework, and a force transmission member coupled to the bearing housing. The force transmission member is configured to apply force to the bearing housing. A spring member is to be compressed as force is applied by the transmission member to the bearing housing. A load indicating apparatus mechanically measures the displacement of the spring member and indicates the amount of force being applied.

In accordance with another embodiment of the present invention a take-up frame system is provided comprising a rotating component supported by first and second bearing sets, a first take-up frame and a second take-up frame supporting the first and second bearing sets, respectively. The take-up frames each include force transmission members coupled to the bearing sets, and spring members having an axis of displacement parallel to a longitudinal axis of the force transmission member. Force indicating mechanisms are configured to indicate the displacement of the spring members.

In accordance with another aspect of the invention, a method of operating a take-up frame is provided comprising reading a force indication that is obtained and provided through mechanical means. The amount of force applied is then adjusted to achieve a desired amount of force.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The techniques and apparatus described herein allow a user to reach and maintain proper tensile or compressive forces on a bearing assembly or transmission component supported by the bearing assembly. The maintenance of proper tensile or compressive forces helps to reduce unnecessary maintenance and downtime that may result from an improper or unbalanced loading of bearing housings. Proper adjustment also enhances the normal operation of components such as belt conveyors, chain drives, and so forth.

Figure 1:
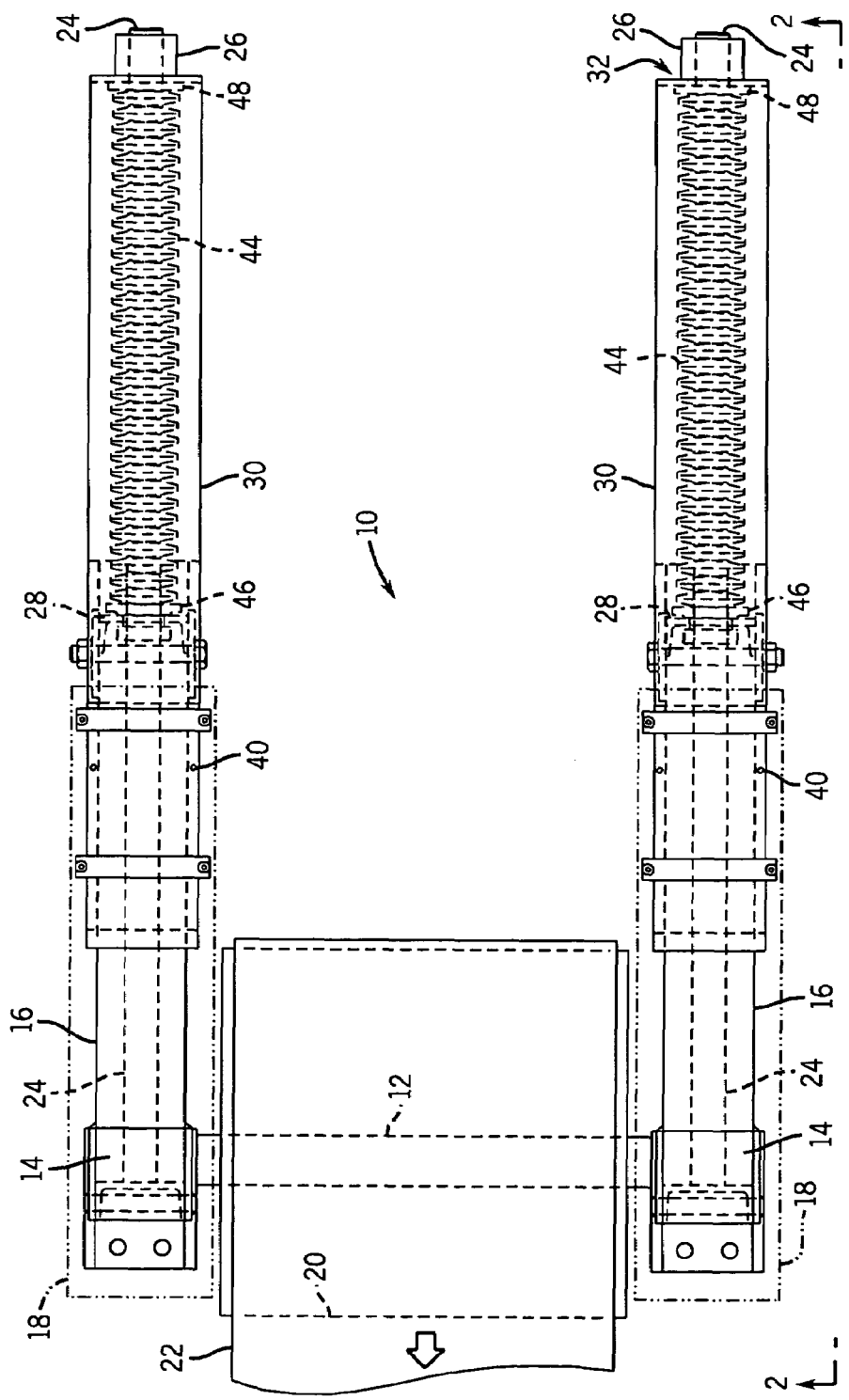
FIG. 1 illustrates a take-up frame assembly in accordance with an exemplary embodiment of the present invention.

Turning to the drawings, and referring first to FIG. 1, a take-up frame assembly is illustrated as applied to lateral sides of a belt conveyor and is generally designated by reference numeral 10. Assembly 10 includes a shaft 12 supported on both ends by bearing assemblies 14. To maintain appropriate loading on the bearing assemblies 14 and, consequently, also the shaft 12, each bearing assembly 14 is positioned inside a take-up frame 16. The take-up frame 16 is mounted on a support structure 18. The support structure 18 may be any appropriate machine support such as a stand or a support framework.

The take-up frame 16 provides a framework that allows the bearing assembly 14 to move linearly in order to adjust the tensile forces applied to the bearing assembly 14. As will be appreciated by those skilled in the art, through appropriate adjustment of the take-up frame 16, and consequent movement of bearing assemblies 14 on either side of the shaft 12, the tension on belt 22 may be adjusted to a level appropriate for the anticipated loading of the take-up frame assembly 10 and the belt. Additionally, appropriate adjustment of the take-up frame 16 helps to properly situate the belt 22 on pulley 20 and avoids lateral creep.

In the presently disclosed technique, visual feedback of applied force allows a user to readily discern proper adjustment. Specifically, as will be described in greater detail below, a mechanical apparatus is provided to indicate force exerted on a bearing assembly 14.

As mentioned earlier, each bearing assembly 14 is mounted in a take-up frame 16 so that it is able to move to adjust the tensile or compressive forces on the belt 22. A force transmission member 24, such as a threaded rod, for example, is attached to the bearing assembly 14. A hex nut 26 supports the force transmission member 24 within the take-up frame 16. As the hex nut 26 or the transmission member 24 is turned, tensile or compressive forces are adjusted. Specifically, as the hex nut 26 is tightened on the forced transmission member 24, the bearing assembly 14 may move within the take-up frame in order to apply force to the belt 22. Alternatively, the hex nut 26 can be loosened in order to reduce the tensile forces applied to the bearing assembly 14 and the belt 22. Movement of the bearing assembly 14 towards the hex nut 26 is limited by an end plate 28. The end plate 28 prevents the bearing assembly 14 from exiting the take-up frame 16.

Figure 2:
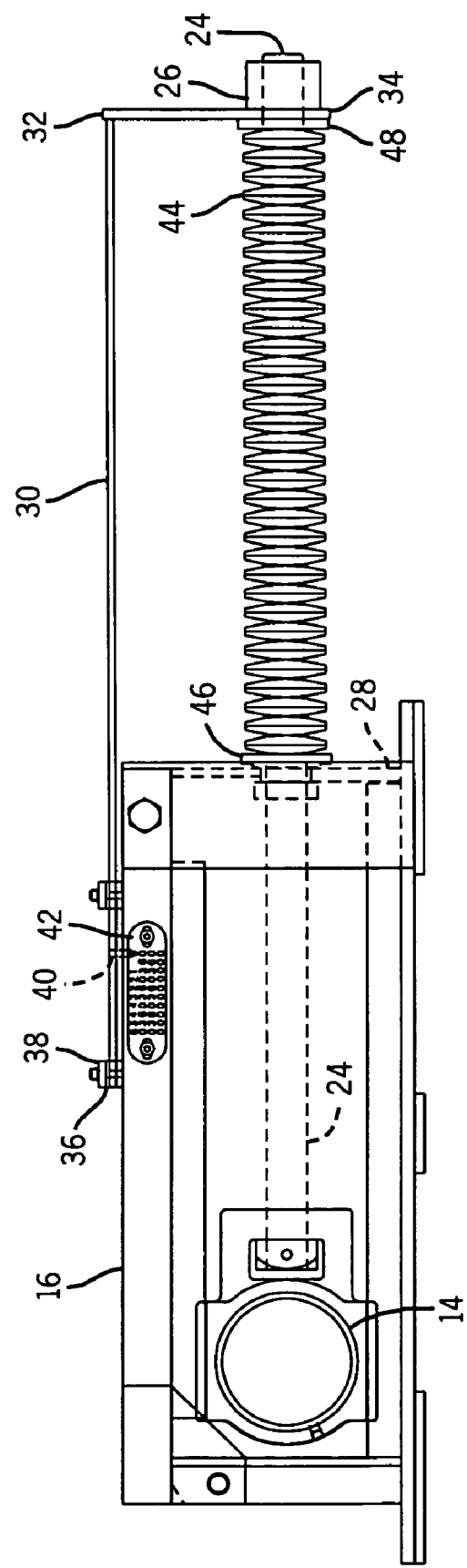
FIG. 2 is a side view of the take-up frame of FIG. 1, configured to provide force feedback to a user in accordance with an exemplary embodiment of the present invention.

As the take-up frame 16 may be used in harsh environments, such as in food processing plants or in mining operations, a cover 30 is provided to prevent debris from coming into contact with parts of the take-up frame 16. The cover 30 is secured to the take-up frame 16 by a slotted guidepost 32 which fits over the threaded rod and is held in place by the hex nut 26. The cover 30 and slotted guidepost 32 may be welded together at a 90 degree angle. Additionally, a lower guide 36 and an upper guide 38 hold the cover in place, as can be seen in FIG. 2. A position indicating piece, such as a cone point set screw 40 is attached to the cover 30 in order to indicate movement of the cover 30 relative to the take-up frame 16, as will be discussed in detail below.

A side view of the take-up frame 16 is illustrated in FIG. 2 in accordance with an exemplary embodiment of the present invention. As can be seen in this view, the cone point set screw 40 protrudes through the cover 30 so that the cone point is directed at a load indicating plate 42 mounted on the take-up frame 16. Movement of the cone point set screw 40 relative to the load indicating plate 42 indicates the amount of force being applied by the force transmission member 24 to the bearing assembly 14. Specifically, the cone point set screw 40 points to imprinted or inscribed numbers on a load indicating plate 42.

The load indicating plate 42 is attached to the take-up frame 16 and may have numbers imprinted, etched, or otherwise placed on it. Alternatively, markings may be made directly to the take-up frame 16 itself, however, such an embodiment may be limited in its ability to be calibrated. As illustrated, the numbers may increase in steps of 400, or in any other incremental step (typically depending upon the range of force that can be applied to the take-up frame, and the reasonable subdivisions of the range). Alternatively, the load indicating plate 42 may simply have markings to indicate relative displacement of the cover 30 to the take-up frame 16. Furthermore, the load indicating plate 42 may have markings to indicate an ideal load level or a range of acceptability for a particular application.

The numbers or markings on the load indicating plate 42 correspond to an amount of tensile or compressive force applied to the bearing assembly 14 by the force transmission member 24. As such, units corresponding to the numbers may be in Newtons, or pounds-force, for example.

The amount of force applied can result from, and be approximated through the use of a spring mechanism such as Belleville washers 44. As will be appreciated by those skilled in the art, the force applied to the bearing assembly will depend upon the effective aggregate spring constant of the Belleville washers, and the compression (i.e., change in aggregate length) of the collection of washers, according to the force equation: $F=Kx$, where F is force, K is the aggregate spring constant, and x is the compression of the set of washers or displacement of the bearing set. The Belleville washers 44 may be positioned on the force transmission member 24 between an outboard washer 46 and an inboard washer 48. The outboard washer 46 may be placed on the end plate 28 of the take-up frame 16, while the inboard washer 48 is on the opposite side of the slotted guidepost 34 from the hex nut 26. The Belleville washers 44 have specific spring constants k that can be obtained from their manufacturer. Moreover, the spring constant k can vary according to the stacking orientations of the washers. For example, the washers can be stacked in the same direction to provide a stiffer spring and maintain the constant k. The washers may also be stacked by alternating their orientation to provide a lower spring constant and greater displacement or deflection for the same applied force. Using such stacking techniques allows for specific spring constants and deflection characteristics to be achieved. The effective aggregate constant K, then is generally the combination (e.g., average) of the constants k, and is selected, along with the overall length of the collection of washers, to provide the desired tension and length adjustability ranges for the take-up frame assembly.

Once the spring constant K is known, the displacement of the Belleville washers 44 is all that is needed to calculate the force applied to the bearing assembly. Accordingly, an approximation of the amount of force applied to the bearing assembly 14 can be obtained by measuring the aggregate deflection or displacement of the Belleville washers 44. Because the end plate 28 of the take-up frame 16 is fixed, and the cover 30 is attached to the opposite end of the washer stack, the aggregate displacement of the washers may be determined by measuring the amount of movement of the cover 30 relative to the take-up frame 16.

It should be noted that any suitable tension or compression arrangement may be used in place of the Belleville washers shown in the figures and described here. These might include both tension and compression springs, compression members of various types (e.g., fluid cylinders), and so forth.

Figure 3:
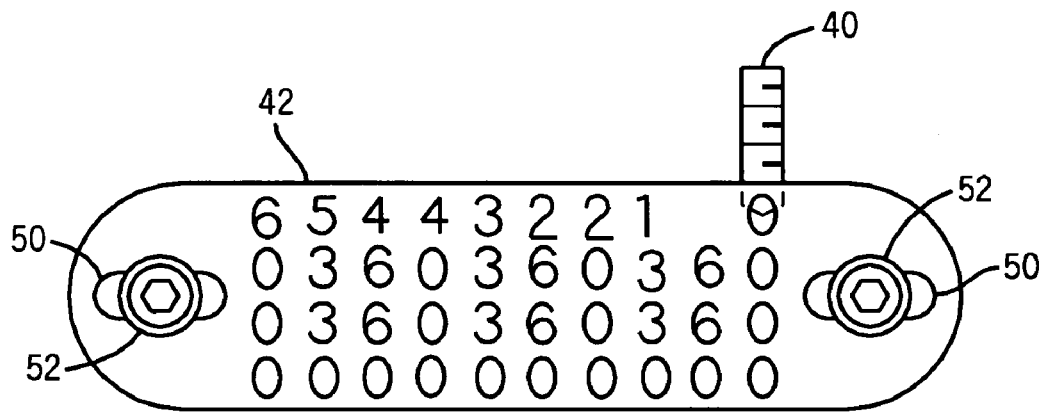
FIG. 3 illustrates a load indicating plate for use in the arrangement of FIGS. 1 and 2, in accordance with an exemplary embodiment of the present invention.

An initial calibration may be necessary to ensure accurate approximation of the force. Specifically, when installing the take-up frame assembly 10 the cone point set screw 40 and the load indicating plate 42 may need to be properly aligned. As illustrated in FIG. 3, the load indicating plate has adjustment slots 50 configured to allow movement of the load indicating plate 42. Adjustment screws 52 are provided to secure the load indicating plate 42 to a take-up frame 16. To calibrate the load indicating take-up frame, the load indicating plate 42 is moved so that the cone point set screw 40 is aligned with the zero position on the load indicating plate 42, with the washers under substantially no compression.

Operation of the take-up frame assembly 10 includes the tightening or loosening of the hex nut 26. Initially, the tightening of the hex nut 26 will only move the bearing assembly within the take-up frame 16. Specifically, the bearing assembly will move towards the end plate 28 and remove slack from the belt 22, or any other component supported by the bearing assembly. Eventually, the slack is removed from the belt and tightening of the hex nut 26 provides tension force to the bearing assembly 14 (i.e., preloading). As the Belleville washers 44 are compressed between the outboard washer 46 and the inboard washer 48, displacement occurs. The displacement of the Belleville washers 44 allows the cover 30 to move parallel to the take-up frame 16. Consequently, the cone point set screw 40 moves relative to the load indicating plate 42 and a user can easily obtain an estimation of the forces being applied to the bearing assembly.

Figure 4:
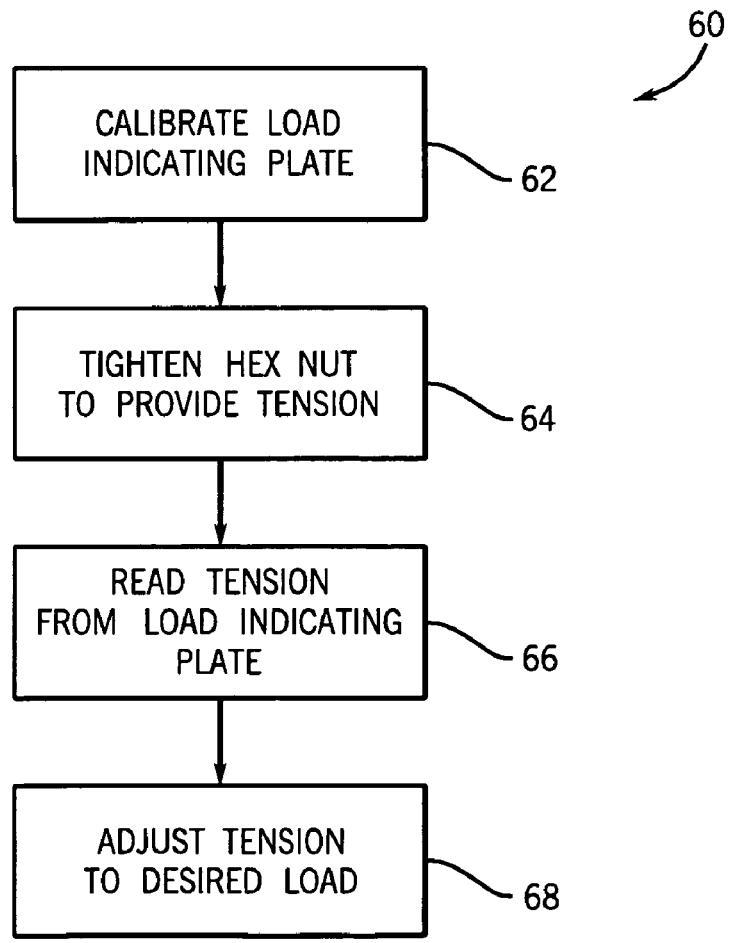
FIG. 4 illustrates steps in an exemplary method for operating a force indicating take-up frame of the type shown in the previous FIGS. in accordance with an exemplary embodiment of the present invention.

Turning to FIG. 4, a technique of operation for a load indicating take-up frame is shown and generally indicated by the reference numeral 60. The technique 60 includes an initial calibration as indicated at box 62. The calibration may include moving a load indicating plate 42 into alignment with a cone point set screw as discussed above, with no preload on the assembly.

Once the take-up frame has been calibrated, a hex nut 28 can be tightened on a force transmission member 24 to provide tension, as indicated at block 64. Initially, the tightening of the hex nut 26 will remove slack from a conveyor belt, chain assembly, or other system component. Once the slack is removed, tensile or compressive forces will be applied to a bearing assembly 14 within the take-up frame 16. As the tension increases, a spring member, such as Belleville washers 44, deforms or is displaced from an initial position. A cover 30 coupled to the spring member is displaced relative to the take-up frame 16 a distance corresponding to the displacement of the spring member.

A user can consult the load indicating plate 42 and obtain an approximation of the amount of tension being applied to the bearing assembly 14 in the take-up frame 16, as indicated at block 66. Specifically, a user can read a number value from the load indicating plate 42 that corresponds to the position of a cone point set screw 40 as discussed above. The number value correlates with the amount of force being asserted by the force transmission member 24 to the bearing assembly 14. Because the force feedback is purely mechanical, the feedback is instant, and requires no connection to any external power source or network.

The ability to read the tension from the load indicating plate 42 allows a user to adjust the tension to a desired load, as indicated at box 68. Specifically, it may be necessary to have the tension in a take-up frame 16 be equal to the tension of another take-up frame supporting a common belt or chain assembly. As discussed above, imbalance in loading may cause premature wear on parts necessitating repair or replacement. As such, the technique 60 helps to reduce downtime and repair expenses by allowing proper and balanced loading. Similarly, over time, the system components (e.g., a conveyor belt) may wear or stretch, and proper force adjustment of the system will be facilitated by the same steps summarized above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A bearing take-up frame assembly comprising:
   a bearing assembly configured to move within a take-up frame framework;
   a force transmission member coupled to the bearing assembly, the force transmission member being configured to apply force to and displace the bearing assembly in the framework;
   a spring member configured to be compressed as force is applied by the transmission member to the bearing assembly;
   a load indicating apparatus mechanically measuring the displacement of the spring member and indicating the amount of force applied to the bearing assembly, the load indicating apparatus comprising:
      a position indicator coupled to the force transmission member and configured to move according to the displacement of the spring element, the position indicator comprising a cover extending over at least a portion of the take-up frame; and
      a load indicator plate coupled to the take-up frame and configured to indicate relative displacement of the position indicator.

2. The take-up frame of claim 1, wherein the force transmission member is a threaded rod, the threaded rod being supported in the take-up frame by a hex nut, wherein turning of the hex nut adjusts the force applied by the force transmission member.

3. The take-up frame of claim 1, wherein the spring member comprises Belleville washers.

4. The take-up frame of claim 1, wherein the load indicator plate is adjustable for calibration of the take-up frame with respect to the position indicator.

5. The take-up frame of claim 1, wherein the bearing assembly supports a shaft.

6. The take-up frame of claim 1, wherein the force transmission member and the load indicating apparatus are configured to operate for compressive or tensile loading.

7. A take-up frame system comprising:
   a rotating component supported by first and second bearing assemblies;
   a first take-up frame supporting the first bearing assembly and a second take-up frame supporting the second bearing assembly, the first and second take-up frames each comprising:
      force transmission members coupled to the bearing assemblies;
      spring members having an axis of displacement along a longitudinal axis of the force transmission members; and
      force indicating mechanisms configured indicate the displacement of the spring members;
      wherein the force indicating members comprise covers configured to move according to the displacement of the spring members.

8. The take-up frame system of claim 7, wherein the spring members comprise Belleville washers.

9. The take-up frame system of claim 7, wherein the spring members are mounted on the force transmission members.

10. The take-up frame system of claim 7, wherein the force transmission members are threaded rods supported by hex nuts.

11. The take-up frame system of claim 7, wherein the covers comprises position indicators, wherein the position indicators correspond to load indicating plates mounted on the take-up frame.

12. The take-up frame system of claim 11, wherein the load indicating plates have numbers representative of the amount of force being applied to the bearing assembly.

13. The take-up frame system of claim 11, wherein the load indicating plates have markings indicating appropriate loading levels.

14. The take-up frame system of claim 7, wherein the load indicating plates are adjustable for calibration of the take-up frame with respect to the position indicators.

* * * * *